(12) United States Patent
Kusnitz et al.

(10) Patent No.: US 7,720,837 B2
(45) Date of Patent: May 18, 2010

(54) SYSTEM AND METHOD FOR MULTI-DIMENSIONAL AGGREGATION OVER LARGE TEXT CORPORA

(75) Inventors: Jeffrey A. Kusnitz, Campbell, CA (US); Daniel N. Meredith, Sunnyvale, CA (US); Linda A. Nguyen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 451 days.

(21) Appl. No.: 11/686,639

(22) Filed: Mar. 15, 2007

(65) Prior Publication Data

US 2008/0228718 A1 Sep. 18, 2008

(51) Int. Cl.
*G06F 17/30* (2006.01)
*G06F 12/00* (2006.01)

(52) U.S. Cl. .................................. 707/711; 707/730

(58) Field of Classification Search .................. 707/3
See application file for complete search history.

(56) References Cited

U.S. PATENT DOCUMENTS

| | | | |
|---|---|---|---|
| 5,852,822 A * | 12/1998 | Srinivasan et al. ............. | 707/4 |
| 5,915,249 A | 6/1999 | Spencer | |
| 6,105,023 A | 8/2000 | Callan | |
| 6,349,308 B1 * | 2/2002 | Whang et al. ............ | 707/103 Z |
| 6,567,810 B1 | 5/2003 | Singhal | |
| 6,665,666 B1 | 12/2003 | Brown et al. | |
| 6,922,700 B1 * | 7/2005 | Aggarwal et al. ........ | 707/104.1 |
| 7,107,260 B2 | 9/2006 | Nakamura et al. | |
| 2002/0161757 A1 | 10/2002 | Mock et al. | |
| 2003/0225752 A1 * | 12/2003 | Bakalash et al. .............. | 707/3 |
| 2003/0225779 A1 * | 12/2003 | Matsuda ..................... | 707/102 |
| 2004/0205044 A1 | 10/2004 | Su et al. | |
| 2005/0144159 A1 * | 6/2005 | Baader et al. .................. | 707/3 |
| 2005/0198076 A1 | 9/2005 | Stata et al. | |
| 2006/0184521 A1 | 8/2006 | Ponte | |
| 2007/0078880 A1 * | 4/2007 | Eiron et al. ................. | 707/102 |
| 2007/0112761 A1 * | 5/2007 | Xu et al. ........................ | 707/5 |
| 2007/0192295 A1 * | 8/2007 | Bakalash et al. ............. | 707/3 |
| 2008/0133473 A1 * | 6/2008 | Broder et al. ................. | 707/3 |

* cited by examiner

*Primary Examiner*—Shahid A Alam
*Assistant Examiner*—Mark E Hershley
(74) *Attorney, Agent, or Firm*—Cantor Colburn LLP; Leonard Guzman

(57) ABSTRACT

Systems and methods for multi-dimensional aggregation. Exemplary embodiments include a method for retrieving data from an inverted list index within a computer system, wherein the index comprises annotated postings, the method including receiving a query in a system, converting the query into a query language, scanning at least one list of postings for data from the query, aggregating the data in the list, thereby resulting in an aggregated list, wherein the aggregating includes recording the occurrence of unique values from the list, mapping the values using a user-provided definition to an alternate value, grouping the values by a user-provided mapping of values to groups, recording and mutating data associated with the unique value in the list, relating the recorded data values with other values in the index and returning the requested data from the aggregated list in a return format.

1 Claim, 3 Drawing Sheets

SYSTEM AND METHOD FOR MULTI-DIMENSIONAL AGGREGATION OVER LARGE TEXT CORPORA

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to inverted indexes used in text corpora indexing, and particularly to systems and methods for multi-dimensional aggregation.

2. Description of Background

An inverted index is constructed over a given corpus of documents, and consists of two primary structures, 1) a dictionary of all the unique terms in the corpus and, 2) for each term in the dictionary, a list of documents that contain the term. The area of large text indexing is active research space and many advancements have been made over the years toward improving the efficiency, performance and scale of indexes. Yet the general functionality of an index has not changed drastically during that period.

In general, inverted indexes are built to serve very simple Boolean queries, such as "Find all documents that contain the word 'IBM'". Indexes respond to queries such as the aforementioned with a subset of the documents that contain the terms, and potentially an estimate of how many other documents also contain the term. Yet the data within an index can be used to provide much more insight than a list of documents for the user to investigate manually. For example, inverted indexes can be used for aggregation of unstructured information across multiple dimensions for large corpora. For example, aggregation could provide a by-email-address count of all e-mail addresses found in the .edu domain. However, current unstructured indexing techniques do not handle aggregation operations well, and current aggregation techniques do not handle unstructured information well.

SUMMARY OF THE INVENTION

Exemplary embodiments include a method for retrieving data from an inverted index within a computer system, wherein the index comprises annotated postings, the method including receiving a query in a system, converting the query into a query language, scanning at least one list of postings for data from the query, aggregating the data in the list, thereby resulting in an aggregated list, wherein the aggregating includes recording the occurrence of unique values from the list, mapping the values using a user-provided definition to an alternate value, grouping the values by a user-provided mapping of values to groups, recording and mutating data associated with the unique value in the list, relating the recorded data values with other values in the index and returning the requested data from the aggregated list in a return format.

Additional exemplary embodiments include a method for multi-dimension inverted index aggregation with a computer system having an input device, a memory and a display, the method including receiving a query in the memory from the input device, converting the query into a query language and sending the request to an index server, parsing the query and identifying requisite postings lists and aggregation keys and functions, initializing the aggregation functions, while results are being collected and prior to a terminating condition (e.g. the expiration of a pre-determined time or consumption of a fixed number of postings/matches), iteratively seeking through the postings list for matches to the query, passing the aggregation keys to the aggregation functions in response to a match, processing the keys with a respective function and mutating key-specific data, entering an index to a table from an output of the functions and collecting the aggregation results and returning the results to the display.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically an indexing strategy and postings format that allows for efficient queries across classes of metadata and a framework for analyzing and aggregating postings metadata has been achieved.

BRIEF DESCRIPTION OF THE DRAWINGS

The subject matter which is regarded as the invention is particularly pointed out and distally claimed in the claims at the conclusion of the specification. The foregoing and other objects, feature, and advantages of the invention are apparent from the following detailed description taken in conjunction with the accompanying drawings in which:

DETAILED DESCRIPTION OF THE INVENTION

Figure 1:
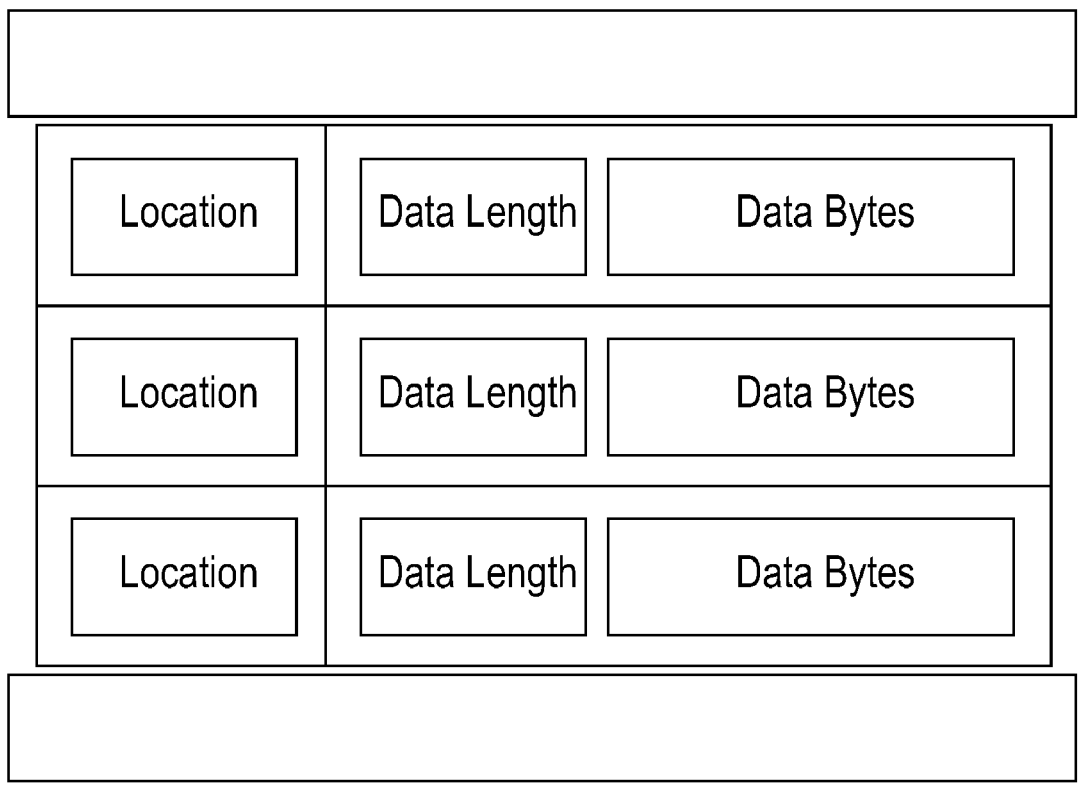
FIG. 1 illustrates an inverted list format in accordance with exemplary embodiments.

Exemplary embodiments include multi-dimensional aggregation where a subsystem is built on top of an existing inverted list index such that candidate documents can be efficiently scanned by relating data values observed to other data values in the index.

Exemplary embodiments further include indexing strategies and postings format that allow for efficient queries across classes of metadata and a framework for analyzing postings metadata. In one implementation, a metadata typing system, and a per posting data field which can store metadata related to a given posting are provided. In another exemplary implementation, a group of query-time operations which provide aggregation and numerical analyses on the metadata stored per posting is provided.

Exemplary embodiments further include a method for retrieving data from an inverted list index within a computer system, wherein the index includes annotated postings, the method consisting of receiving a query in the computer converting the query into a query language, scanning at least one list of postings for data from the query, aggregating the data in the list, thereby resulting in an aggregated list, wherein the aggregating includes recording the occurrence of a unique value from the list, recording and/or mutating one or more datum(s) relating to the unique value in the list and relating the recorded values in the index and returning the requested data from the aggregated list in a return format.

The flexible indexing framework allows for storing mined data in the index and accessing it through an index term. For example, a data miner that tags documents whenever it finds a person's name can be implemented. Using an index term such as <<PERSON>>, the indexing framework can record all names in an inverted list, using the data fields to store the individual names. Queries can then be supported such as, "Find me all documents that contain "quarterly report", "IBM" and any '<<PERSON>>'". Answering a question like the aforementioned only requires four inverted lists. Additionally, a query engine can return the list of all the names that were actually hidden behind the postings of the term <<PERSON>>. This feature gives the users the ability to find documents and learn more about the document set as well. The additional overhead of using data fields is offset by the token-type model deployed, which allows for tailored compression mechanism based on the type of an index terms, as well as the added capabilities of the index in answering queries.

To overcome the burden of transferring large sets of data from the data fields along with the list of documents that match a query, an aggregation over inverted list metadata method can be employed. Query language is extended with an AGGREGATION operation that allows processing of all the data fields for all postings for a given index term. The method can be implemented to count unique data fields and return the top N values with their counts. The query can then return the set of document identifiers satisfying the query and a much smaller additional set containing the aggregate view of the <<PERSON>> inverted list.

Within the indexes described herein, the metadata portion of a posting is expanded to potentially include an arbitrary data value associated with the posting as shown in FIG. 1, in which the location block in each posting represents the positional information. Adding more data to a posting is discussed further in the description below in which query processing and techniques for minimizing its impact is discussed. Exemplary indexes that conform employ methods that allow the analysis and annotation of unstructured information (e.g., web documents), and provide a framework to build an index of the annotation and analysis results.

The embodiments described herein support several aggregation feature, such as, but not limited to: aggregation on single or multiple keys, and in the case of multiple keys, the order of the aggregation can be specified; map functions can be defined in order to transform values; partitions of the key space can be specified, in order to aggregate into custom segments; and process functions can be defined which specify how values are aggregated.

Figure 2:
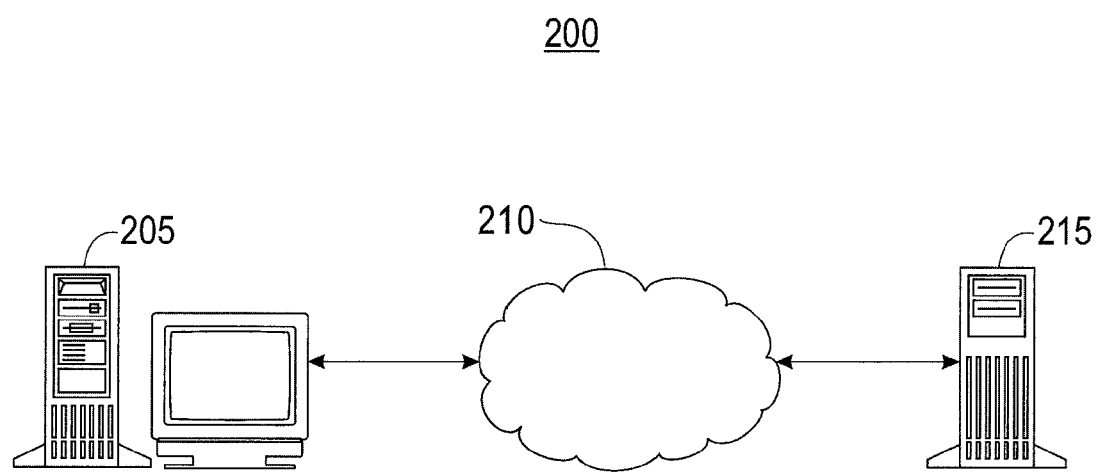
FIG. 2 illustrates a system level diagram of an exemplary multi-dimensional aggregation system.
Figure 3:
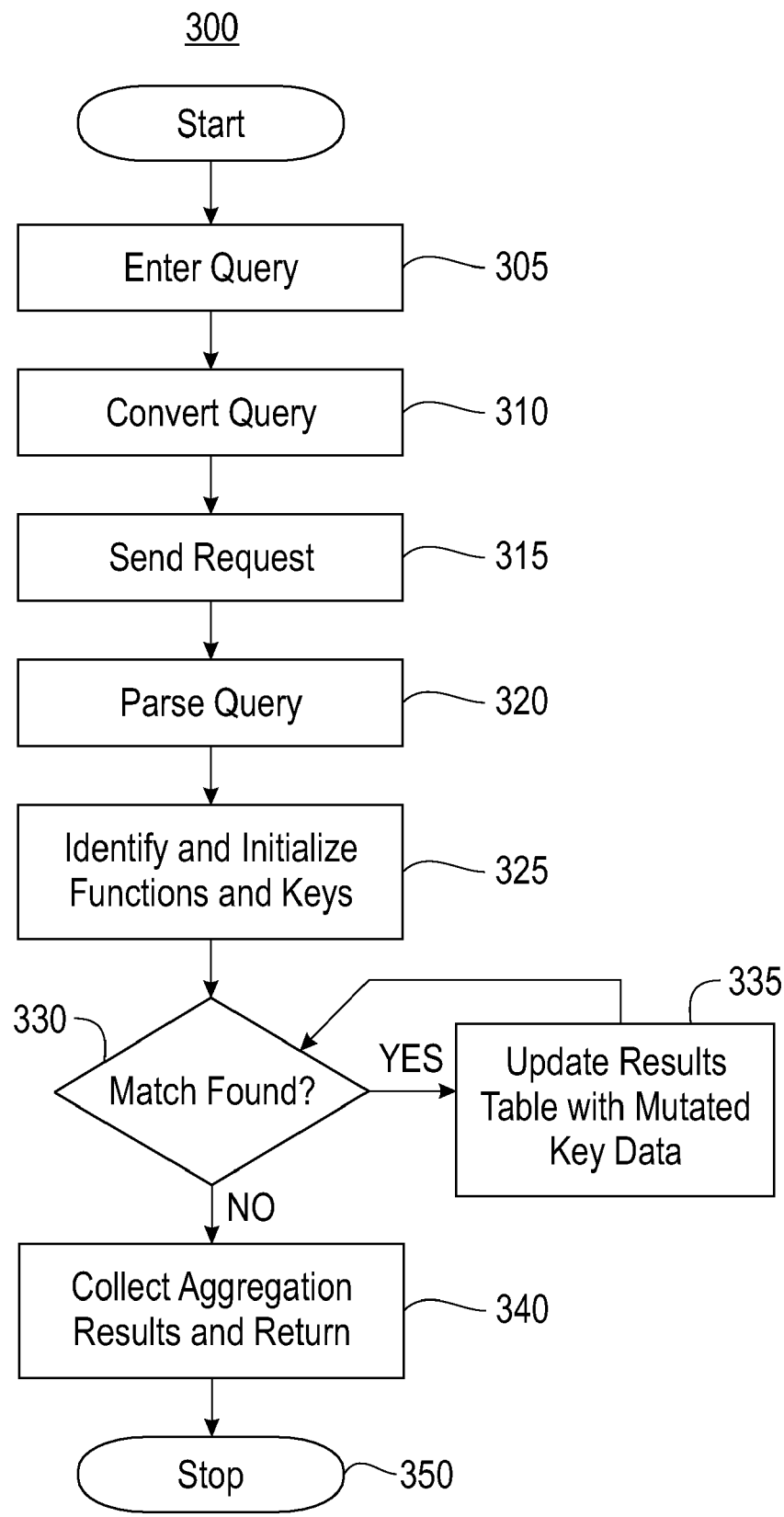
FIG. 3 illustrates an exemplary multi-dimensional aggregation method The detailed description explains the preferred embodiments of the invention, together with advantages and features, by way of example with reference to the drawings.

FIG. 2 illustrates a system level diagram of an exemplary multi-dimensional aggregation system 200, which includes computer 205, network 210 and index server 215. In an exemplary multi-dimensional method 300 as illustrated in FIG. 3, a user can, at step 305, enter a query—"show me how many times each month American Idol is mentioned on the Internet" in computer 205, which converts the query, at step 310, into a well-defined query language and sends the request to index server 215 at step 315, which can be via network 210. Index server 215 parses the query at step 320 and identifies the requisite postings lists, required aggregation keys and functions. The aggregation functions are initialized and an empty results table is created. The aforementioned occurs at step 325. In general, while the conditions, not out of time and not enough results, exist, index server 215 seeks through the postings lists for matches. When a match is found at step 330, the aggregation keys are passed to the aggregation function in step 335, which processes the keys with the indicated function and increments the key-specific counters and accumulates the results in the results table. The index server 215 collects the aggregation results table and returns them to computer 205 at step 240.

An alternate exemplary method for retrieving data from an inverted list index within a computer system, wherein the index comprises annotated postings, includes scanning at least one list of the postings for the data, aggregating the data in the list, thereby resulting in an aggregated list; and returning the requested data from the aggregated list in a return format. In one exemplary implementation, aggregating includes recording the occurrence of a unique value from the list; and recording the frequency of the unique value in the list. The aggregating can further include relating the recorded values to the remaining values in the index, and the relating can include creating related tables of the values.

Furthermore, in other exemplary implementations the method can further include aggregating counts of the values over at least one key, aggregating counts of the mappings of the values over at least one key, aggregating counts of the values over at least one set of values associated with at least one key, aggregating mappings of the values over at least one set of values associated with at least one key, and aggregating mappings of alternate values over an aggregation of the values over at least one key.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for retrieving data from an inverted list index within a computer system, wherein the index comprises annotated postings, the method consisting of:
   receiving a query in a system;
   converting the query into a query language;
   scanning at least one list of postings for data from the query;

aggregating the data in the list, thereby resulting in an aggregated list, wherein the aggregating includes:
recording the occurrence of unique values from the list;
mapping the values using a user-provided definition to an alternate value;
grouping the values by a user-provided mapping of values to groups;
recording and mutating data associated with the unique value in the list;
relating the recorded data values with other values in the index; and
returning the requested data from the aggregated list in a return format;
aggregating counts of the unique values over at least one aggregation key;
aggregating counts of the mappings of the values over the at least one aggregation key;
aggregating counts of the values over at least one set of values associated with the at least one aggregation key;
aggregating the mappings of the values over at least one set of values associated with the at least one aggregation key; and
aggregating mappings of alternate values over an aggregation of the values over the at least one aggregation key,
wherein the annotated postings contain document identification, occurrence identification, and occurrence related data, wherein alternately occurrence related data is accessible using document identification and occurrence identification,
wherein the unique value is the result of a computation on a pre-existing value,
wherein recording data associated with the unique value takes place during query processing,
wherein mutating data associated with the unique value includes numeric calculations, or referential mappings.

* * * * *